United States Patent

Shirasaka et al.

[15] 3,639,212
[45] Feb. 1, 1972

[54] PROCESS FOR THE PREPARATION OF ESTRANE COMPOUND BY FERMENTATION

[72] Inventors: Makoto Shirasaka; Katsumi Tanabe; Atsushi Naito; Masako Ieki, all of Tokyo, Japan

[73] Assignee: Sankyo Company Limited, Tokyo, Japan

[22] Filed: Aug. 12, 1968

[21] Appl. No.: 751,735

[52] U.S. Cl. .................................. 195/51 F, 195/117
[51] Int. Cl. ................................................ C07c 167/14
[58] Field of Search ........................ 195/51 G, 51 F, 117

[56] References Cited

UNITED STATES PATENTS 3,162,655  12/1964  Bagli ........................... 195/51 F
3,189,528  6/1965   Smith et al. .................. 195/51 F
3,344,038  9/1967   Greenspan et al. ............ 195/51 F
3,379,621  4/1968   Campillo ...................... 195/51 G
3,395,078  7/1968   Vezina et al. ................. 195/51 G
3,451,892  6/1969   Herzog et al. ................ 195/51 G
3,507,749  4/1970   Sih ............................. 195/51 G Primary Examiner—Alvin E. Tanenholtz
Attorney—McGlew and Toren

[57] ABSTRACT

Estrane compounds that are known to be useful as sex hormones or as intermediates thereof are prepared by subjecting 19-hydroxyandrostane starting compounds to the action of *Corynebacterium equi* or to the action of the enzyme produced by said micro-organism under aerobic conditions in the presence of a surface active agent of the fatty acid ester series such as Tween 80, said starting compound being incorporated into a culture medium at a concentration of 2 to 3 w/v percent.

3 Claims, No Drawings

PROCESS FOR THE PREPARATION OF ESTRANE COMPOUND BY FERMENTATION

This invention relates to a novel method for the production of an estrane compound by fermentation.

More particularly it relates to a novel process for preparing an estrane compound having the formula

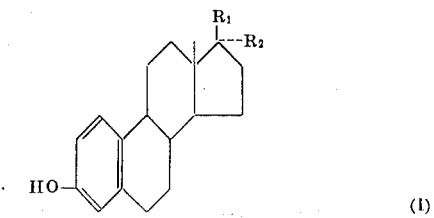

wherein $R_1$ is hydroxy group and $R_2$ is a lower alkynyl group or $R_1$ and $R_2$, when taken with the carbon atom to which they are attached, represent keto group which comprises subjecting a 19-hydroxyandrostane compound having the formula

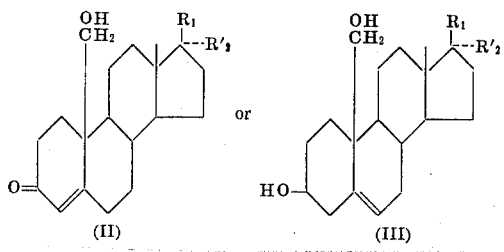

wherein $R_1$ has the same meaning as hereinabove and $R'_2$ is hydrogen atom or a lower alkynyl group or $R_1$ and $R'_2$, when taken together with the carbon atom to which they are attached, represent keto group, to the action of a micro-organism selected from those micro-organisms of the genera *Corynebacterium* and *Arthrobacter* or to the action of the enzymes produced by said micro-organism under aerobic condition.

The above-mentioned estrane compound (I) is a steroidal compound which is well known in the art to be useful as ovarian hormones.

The chemical synthesis of estrone was heretofore rewarded with success [See, Journal of the Pharmaceutical Society of Japan, 80, 1671, (1960)].

Moreover, the microbiological process for the preparation of estrone is disclosed in the Journal of the American Chemical Society, 83, 4,627, (1961). According to the disclosure of the latter literature, estrone is produced by subjecting 19-hydroxyandrost-4-ene-3,17-dione to the action of *Pseudomonas* s.p. B-20-184.

It would be, however, strongly desired in the art to find out the more advantageous method for the production of the estrane compound. As a result of our investigations on a method for the microbiological production of the estrane compound, it has been unexpectedly found that the 19-hydroxyandrostane compound (II) or (III) can be satisfactorily converted to the estrane compound (I) by the action of a micro-organism selected from those micro-organisms of the genera *Corynebacterium* and *Arthrobacter*.

It is, therefore, an object of this invention to provide a novel and advantageous method for the microbiological production of an estrane compound by the action of a micro-organism of the genera *Corynebacterium* or *Arthrobacter*. Other objects of this invention will be apparent to those skilled in the art from the following disclosure.

In the microbiological method of this invention as depicted above, typical examples of the 19-hydroxyandrostane compound (II) and (III) to be employed as a substrate include the following steroid:

19-hydroxyandrost-4-ene-3,17-dione,
3,19-dihydroxyandrost-5-en-17-one and
17α-ethynyl-17β,19-dihydroxyandrost-4-en-3-one.

Typical examples of the micro-organisms which have been found to be useful for the method of this invention include those micro-organisms: that is,

*Corynebacterium equi* and
*Arthrobacter ureafaciens*

These micro-organisms are described in the Bergey's Manual of Determinative Bacteriology, 7th Edition, p.588 (1957).

In carrying out the method of this invention, with such a micro-organisms as described above as such may be inoculated a suitable culture medium containing said compound (II) or (III) as a substrate, and then cultivation may be effected under aerobic condition. The method may also be carried out by employing the above-mentioned micro-organisms after adaption. Thus, the culture in which said micro-organisms had previously incubated in a suitable medium containing said compound (II) or (III) may be incorporated and cultivated in a suitable culture medium containing said compound (II) or (III) as a substrate under aerobic condition. Alternatively, the micro-organism may be inoculated and cultivated in a suitable culture medium containing no substrate under aerobic condition and successively the aerobic culture is conducted after addition of the substrate. Moreover, the method of this invention may be successfully conducted by employing the enzymes (or the crude liquor thereof) obtained from the growing micro-organism through disruption of the cell by a conventional means, for example, by a French Press, a sonic oscillator, lyzozyme, a surface active agent and the like. In any case, the aerobic condition should be kept in the present method. The culture medium may be composed of usual ingredients commonly used for the cultivation of such micro-organisms as described above. Suitable culture medium contains a source of carbon, nitrogen and, if necessary, mineral elements (inorganic salts). Suitable carbon sources include glucose, sucrose, xylose, cane sugar, starch, glycerin and the like. Suitable nitrogen sources include corn steep liquor, peptone, yeast extract, meat extract, soybean meal and the like. Suitable mineral elements sulfate, calcium sodium chloride, ammonium nitrate, magnesium sulfate, calcium carbonate, dipotassium hydrogenphosphate and the like.

In carrying out the fermentation, there may be satisfactorily employed any of aerobic culture procedures commonly used in the art, but shaking culture, stationary culture and culture with aeration may be preferably employed. The culture is generally conducted at a temperature of about 25° C. to 30° C. It is desirable that the pH value of the culture medium is within the pH range of about 5.0 to 9.0, preferably about 6.0 to 8.0. The fermentation is generally continued for about 3 to 15 days. The substrate may be added to the culture medium either in a finely divided form or as a solution (suitably, a saturated solution) in a suitable organic solvent, such as dimethylformamide, methanol, acetone and the like. It has also been found that, when *Corynebacterium equi* is employed as a micro-organism, addition of the substrate to a culture medium can be effected in a high amount, preferably about 2-3 w/v percent, thereby to improve the yield of the desired estrane compound. In this case, it is desirable that a surface active agent of fatty acid ester series, such as Tween 20, 60, and 80; Span 60; and Myrj 49 and 51 (these are trade names of the surface active agents manufactured and sold by Atlas Chemical Industries Wilmington 99, Del. U.S.A.) is added to the culture medium at a concentration of about 3 w/v percent, so that the substrate is well dispersed in a culture medium and an activity of the surface of the substrate particle is also elevated. During the cultivation, a carbon source may be additionally supplied by optional addition of sugar such as glucose and the like to shorten the cultivation period and to suppress the production of byproducts. When sugar, e.g., glucose is added, the pH of a culture medium is inclined to acidic. Thus, it is preferable to maintain the pH of a culture medium over pH 5.0 by addition of a proper amount of calcium carbonate.

In the process of this invention, where there is employed as a substrate the 19-hydroxyandrostane compound of the formula (II) or (III) wherein the $R_1$ is hydroxy group and the $R'_2$ is hydrogen atom, there is obtained the estrane compound of the formula (I) wherein the $R_1$ and the $R_2$, together with the carbon atom to which they are attached, represent keto group. The isolation of the desired product from the fermentation broth may be conducted by any suitable manner well known in the art. For instance, the broth is extracted several times with ethyl acetate, the combined extracts are washed successively with aqueous sodium bicarbonate, aqueous dilute hydrochloric acid and water, dried over anhydrous sodium sulfate and concentrated to obtain crude crystalline substance. The crude crystalline substance is recrystallized from a suitable solvent such as acetone, methylene chloride or chromatographed through a column of alumina with ethylacetate-n-hexane to give the desired compound (I).

The following examples are given solely for the purpose of illustration of this invention, but they should not be construed as limiting the scope thereof.

EXAMPLE 1

A culture medium comprising the following ingredients was prepared:

| Ingredient | Percent |
| --- | --- |
| corn steep liquor | 0.7 |
| ammonium nitrate | 0.2 |
| dipotassium hydrogenphosphate | 0.05 |
| magnesium sulfate (7H$_2$O) | 0.05 |

The culture medium (200 ml.) was adjusted to pH 7.2–7.4 and divided into two 500-ml.-volume shaking flasks, each containing 100 ml. of the medium. After sterilization at 120° C. (under pressure of 15 lb.) for 15 minutes, a substrate, i.e., 19-hydroxy-androst-4-ene-3,17-dione dissolved in 2 ml. of dimethylformamide at the concentration indicated hereinbelow was added with each 1 ml. portion to these flasks. Then Corynebacterium equi was inoculated and shaking culture was carried out at 30° C. with 120 r.p.m. for from 3 to 11 days. After incubation, the fermentation broths were collected and extracted three times with ethyl acetate. The combined extracts were concentrated under reduced pressure to give oily substance. The oily substance was then chromatographed through a column of alumina by employing as an eluent ethyl acetate-cyclohexane. After removal of the solvent from the eluate, there was obtained the final product, estrone.

The product thus obtained was identified with an authentic specimen by means of a position on thin layer chromatography, chemical color tests and ultraviolet absorption spectra.

By employing Arthrobacter ureafaciens instead of Corynebacterium equi, there was similarly obtained estrone. The yields of estrone obtained by the above-mentioned method were as follows:

TABLE 1

| Concentration of the substrate added, w./v. percent | Percent | | |
| --- | --- | --- | --- |
| | 0.05 | 0.1 | 0.2 |
| Microorganism: | | | |
| Corynebacterium equi | 26.5 | 27.3 | 33.5 |
| Arthrobacter ureafaciens | 81.0 | 83.5 | |

EXAMPLE 2

Following the same procedure as in example 1 except that 3,19-dihydroxy-androst-5-en-17-one in the form of a powder finely divided with a mortar was employed at the concentration indicated hereinbelow, there was similarly obtained estrone.

The yields of estrone obtained by the above-mentioned method were as follows:

TABLE 2

| Concentration of the substrate added, w./v. percent | Percent | |
| --- | --- | --- |
| | 0.05 | 0.1 |
| Microorganism: | | |
| Corynebacterium equi | 23.3 | 25.0 |
| Arthrobacter ureafaciens | 73.5 | 76.0 |

EXAMPLE 3

To a 50-ml.-volume shaking flask having the shape of the letter "L" was placed 20 ml. of a main culture medium (pH 6.2) comprising peptone 2 percent, corn steep liquor 0.5 percent and "Tween 80" 3.0 percent which is sterilized at 120° C. for 15 minutes and then allowed to cool. To the cooled medium was incorporated 400 mg. (2 g. per 100 ml. of the medium) of a finely divided substrate, 19-hydroxyandrost-4-ene-3,17-dione (I), having been previously sterilized by irradiation of ultraviolet ray.

On the other hand, a liquid culture medium (pH 7.2) comprising peptone 2 percent and corn steep liquor 0.5 percent and inoculated with Corynebacterium equi was subjected to a shaking culture at 26° C. for 24 hours.

With 2 ml. of the seed culture broth obtained as described above was inoculated the above-mentioned main culture medium containing the substrate.

Then, a shaking culture was conducted at 26° C. for 24 hours. At the end of this time, 100 mg. of calcium carbonate and 0.5 ml. of a 40 percent aqueous glucose solution were aseptically incorporated into the main medium (final concentration of glucose in the medium was 1.0 percent).

A shaking culture was continued for additional 24 hours. At the end of this time 0.5 ml. of a 40 percent aqueous glucose solution was again incorporated into the medium (final concentration of glucose in the medium was 1.0 percent).

Then, a shaking culture was effected for additional 24 hours. At the end of this time, the substrate powder incorporated disappeared away and, instead, estrone were separated as needles in the fermentation broth. Such oxidative fermentation has come to an end in 3 days.

The fermentation broth was extracted several times with ethyl acetate, the combined extracts were concentrated under reduced pressure, and the residue was chromatographed through a column of alumina to yield estrone as crystals in a yield of about 78 percent.

The product so obtained was identified with an authentic specimen by means of a thin layer chromatography. It melts at 250°–252° C., and shows λmax EtOH 281 mμ and $[\alpha]D20+159$.

EXAMPLE 4

Following the procedure of example 3, 500 mg. (2.5 g. per 100 ml. of the main culture medium) of 3,19-dihydroxyandrost-5-en-17-one (II) was incorporated into the main culture medium and then the seed culture broth containing Corynebacterium equi was added thereto.

Then, a shaking culture was conducted at 26° C. for 24 hours. At the end of this time, 100 mg. of calcium carbonate and 0.5 ml. of a 40 percent aqueous glucose solution were aseptically incorporated into the fermentation broth (final concentration of glucose in the medium was 1.0 percent).

Thereafter, a shaking culture was continued in the same manner as above, for 4 days, during which period of time was incorporated each 0.5 ml. portion of a 40 percent aqueous glucose solution every 24 hours. The oxidative fermentation has come to an end in 5 days. The fermentation broth was extracted several times with ethyl acetate, the combined extracts were concentrated under reduced pressure and the residue was chromatographed through a column of alumina as described in example 4, thereby to yield estrone as crystals in a yield of about 69 percent. The product so obtained melts at 247°–251° C. and shows λmax EtOH 281 mμ and [α]D20=+163.

EXAMPLE 5

The same procedure as in example 3 is repeated except the calcium carbonate and aqueous glucose solution were not incorporated into the main culture medium during the fermentation. There was obtained estrone as crystals in a yield of 57 percent.

EXAMPLE 6

Following the same procedure as in example 3 except that a powder of 17α-ethynyl-17β,19-dihydroxyandrost-4-en-3-one was employed instead of a solution of 19hydroxyandrost-4-ene-3,17-dione in dimethylformamide, there was similarly obtained 17β-ethynylestradiol, melting at 110°–112° C. The product thus obtained was identified with an authentic specimen by means of a mixed melting point and ultraviolet absorption spectra.

The yields of estradiol obtained by the above-mentioned method were as follows.

TABLE 3

| Concentration of the substrate added, w./v. percent | Percent | |
|---|---|---|
| | 0.1 | 0.05 |
| Microorganism: | | |
| Corynebacterium equi | 28.4 | |
| Arthrobacter ureafaciens | | 33.7 |

What is claimed is:

1. A method for the production of a compound having the formula

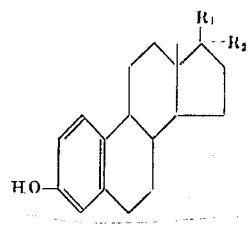

wherein $R_1$ is a hydroxyl group and $R_2$ is a lower alkynyl group or $R_1$ and $R_2$, when taken together with the carbon atom to which they are attached, represent a keto group which comprises subjecting a starting compound having the formula

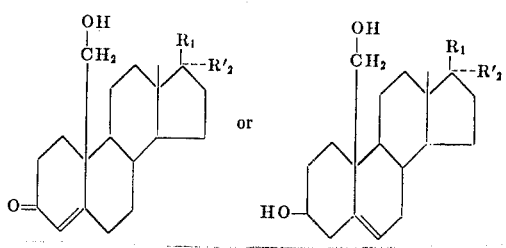

wherein $R_1$ is a hydroxyl group and $R_2'$ is hydrogen or a lower alkynyl group or $R_1$ and $R_2'$, when taken together with the carbon atom to which they are attached, represent a keto group to the action of *Corynebacterium equi* or to the action of the enzyme produced by said micro-organism under aerobic conditions in the presence of a surface active agent of the fatty acid ester series, said starting compound being incorporated into a culture medium at a concentration of 2 to 3 w/v percent.

2. The method according to claim 1 wherein said surface active agent is Tween 80.

3. The method according to claim 1 wherein said starting compound is selected from the compounds consisting of 19-hydroxyandrost-4-ene-3,17-dione, 3,19-dihydroxyandrost-5-en-17-one, and 17α-ethynyl-17β,19-dihydroxyandrost-4-en-3-one.

* * * * *